Patented Apr. 4, 1939

2,153,201

UNITED STATES PATENT OFFICE 2,153,201

FAST POLYAZO DYES

Arthur R. Murphy, deceased, late of Penns Grove, N. J., by Margaret R. Murphy, administratrix, Penns Grove, N. J., and Swanie S. Rossander, Wilmington, Del., assignors to E. I. du Pont de Nemours & Company, Wilmington, Del., a corporation of Delaware No Drawing. Application August 25, 1937, Serial No. 160,855

13 Claims. (Cl. 8—46)

This invention relates to polyazo dyes, and especially to such dyes that are developed on the fibre and are useful to dye cotton, regenerated cellulose and similar materials to produce colors which are especially fast to washing; to fabrics dyed with the dyes and to processes of making the dyes and dyeings.

It is an object of the invention to provide dyeings on cotton, regenerated cellulose and similar materials which have excellent fastness to washing. Another object of the inventon is to provide developed dyes on said materials from a class of polyazo dyestuffs having a plurality of diazotizable amino groups which hereinafter will be more particularly described. Another object of the invention is to provide processes of making the dyes. Another object of the invention is to provide fabrics dyed with the dyes and processes therefor. Still other objects of the invention will be apparent from the following description of the invention.

The primary objects of the invention are attained in general by first dyeing a fabric with a dyestuff which is represented by the general formula

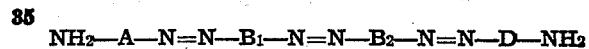

in which A is a benzene nucleus which may or may not be substituted by alkyl, alkoxy, aryl or halogen, B₁ and B₂ are like or unlike radicals of 1:6-Cleve's acid, 1:7-Cleve's acid or a mixture of the two, and D is a benzene or naphthalene nucleus having an open coupling position para to amino and which may or may not be substituted by alkyl, alkoxy or hydroxy. Secondly the dyestuff is tetrazotized on the fabric and then developed by coupling with an azo dye coupling component which is devoid of solubilizing groups, such as sulfonic acid and carboxyl.

The invention is illustrated by the following examples but it is not limited thereto.

Example I

Five parts of cotton piece goods were dyed in the usual manner, known to those skilled in the art, with two hundredths parts of P. P. D.→1:6-Cleve's acid→1:7-Cleve's acid→cresidine a compound which is represented by the formula the formula

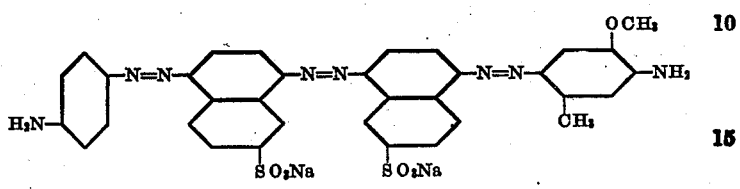

This compound dissolves in water giving a blue solution and it dyes cotton, regenerated cellulose and related materials in shades of blue. The compound may be made by coupling one part of 1:7 Cleve's acid in medium neutral to Congo red paper to one part of diazotized oxalyl-paraphenylene diamine, finally dissolving the solids and then making the solution alkaline to Brilliant yellow paper, salting and filtering off the product of coupling. This product of coupling is made into a slurry, diazotized and coupled to one part of 1:6-Cleve's acid by a similar procedure. The latter product of coupling is diazotized and coupled to one part of cresidine by adding the slurry of diazo salt to a solution of cresidine in hydrochloric acid whilst keeping the coupling medium neutral to Congo red paper, and finally making the medium acid and salting out the disazo compound. The acylamino group of the compound is converted to an amino group by hydrolyzing in alkaline solution. The compound is then salted out, filtered and dried.

The dyed fabric was rinsed in cold water and put in 200 parts of water at 20° C. Three tenths part of sodium nitrite and four tenths part of sulfuric acid were added to the water and it was stirred 15 minutes. The goods were then rinsed with cold water and immersed with rapid stirring in a solution made by dissolving one tenth part of beta-naphthol in 200 parts water which contained one twentieth part of caustic soda. The solution was stirred rapidly while adding the above rinsed piece goods and stirring was continued for 15 minutes. The goods were then rinsed in cold water and dried. The dyeing was a blue shade. The probable formula of the dye on the fiber is group, as the case may be. As examples of acylamino groups, acetyl-, propynoyl-, and

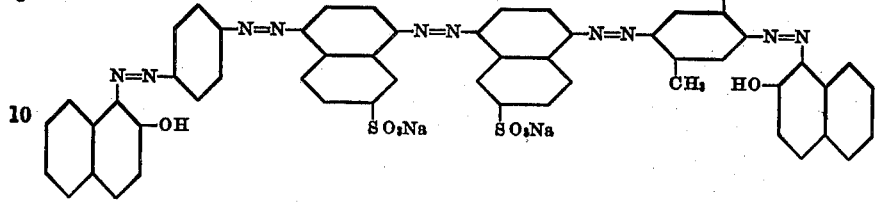

The dyeing was found to have outstanding fastness to washing and good fastness to other exposures ordinarily encountered by dyed fabrics.

In the following examples fabrics of cotton and regenerated cellulose were dyed with the dyestuffs designated as Diazo component, the dyestuff was diazotized on the fibre and coupled to the coupling components enumerated. The compounds represented as diazo components may be made by methods similar to the corresponding component described in Example I. The dyestuffs shown as diazo components are indicated by radicals of the compounds which radicals appear in the diazo compound. The arrows point from the aryl amine or azo compound which is diazotized toward the compound which is coupled thereto. The letters P. P. D. stand for the radical of para-phenylene diamine, and M. P. D. stand for the radical of meta-phenylene diamine.

benzoylamino groups are mentioned, but still others which are readily hydrolyzed can be used.

The developed dye is represented generally by the formula

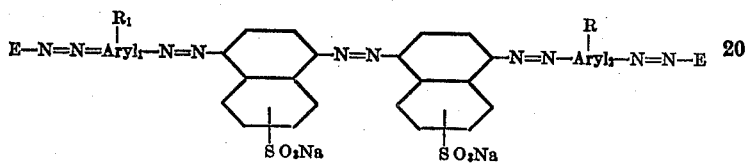

in which $Aryl_1$ is the radical of a benzene compound which is connected to azo groups in meta or para positions, $Aryl_2$ is the radical of a benzene or naphthalene compound which is connected to azo groups in para positions, $R_1$ is at least one of the group consisting of hydrogen, alkyl, alkoxy, aryl and halogen, R is at least one of the group consisting of hydrogen, alkyl, alkoxy and hydroxy, and E is the radical of an azo dye coupling component which is devoid of solubilizing groups.

As examples of alkyl, alkoxy, aryl and halogen groups, methyl, ethyl, propyl and even longer chain alkyl groups, the corresponding alkoxy groups, benzene, naphthalene, chloro and bromo are mentioned, but others can be used.

|  | Diazo component | Coupling component | Shade on cotton and regenerated cellulose |
|---|---|---|---|
| II | P. P. D.→1:7 Cleve's acid→1:6-Cleve's acid→cresidine | Beta-naphthol | Blue. |
| III | ____do____ | 1-phenyl-3-methyl-5-pyrazolone | Violet. |
| IV | ____do____ | Acetoacetanilide | Do. |
| V | ____do____ | Meta tolylene diamine | Blue black. |
| VI | ____do____ | Beta-naphthol | Blue. |
| VII | P. P. D.→1:6-Cleve's acid→1:7-Cleve's acid→cresidine | ____do____ | Do. |
| VIII | P. P. D.→1:7-Cleve's acid→1:7-Cleve's acid→cresidine | ____do____ | Do. |
| IX | P. P. D.→mixed Cleve's acid→1:6-Cleve's acid→cresidine | ____do____ | Do. |
| X | P. P. D.→mixed Cleve's acid→mixed Cleve's acid→meta-toluidine. | ____do____ | Do. |
| XI | P. P. D.→mixed Cleve's acid→1:6-Cleve's acid→meta-toluidine | ____do____ | Do. |
| XII | P. P. D.→mixed Cleve's acid→1:7-Cleve's acid→meta-toluidine | ____do____ | Do. |
| XIII | P. P. D.→mixed Cleve's acid→1:7-Cleve's acid→2:5-dimethoxy-aniline. | ____do____ | Do. |
| XIV | M. P. D.→mixed Cleve's acid→mixed Cleve's acid→cresidine | ____do____ | Do. |
| XV | P. P. D.→1:6-Cleve's acid→1:7-Cleve's acid→m-toluidine | ____do____ | Do. |

The dyeings made in accordance with Examples II to XV had outstanding fastness to washing and good fastness to other exposures.

The compounds used as the direct dyestuffs may be made in general by coupling one part of a Cleve's acid to one part of a diazotized amino benzene compound which is substituted in a meta or para position by a nitro or an acylamino group. This product of coupling is diazotized and coupled to one part of a Cleve's acid, and the last product of coupling is diazotized and coupled to one part of an aryl amine having a free coupling position para to the amino group. Finally the trisazo compound is given a reducing or hydrolyzing treatment to reduce the nitro or hydrolyze the acylamino The intermediate radicals of 1:6- and 1:7-naphthylamine sulfonic acids may be either of these acids or mixed Cleve's acid, and the two radicals may be from the same or from different Cleve's acids.

Although the last product of coupling can be made in substance, its only value as a textile dye is when it is developed on the fibre by coupling with a certain class of coupling components.

The coupling components are those which are devoid of solubilizing groups. The hydroxy compounds of the benzene and naphthalene series, amino-benzene compounds, naphthylamine compounds, hydroxy-amino-benzene compounds, amino-naphthols, N-substituted derivatives of amino-naphthols, aryl-pyrazolone compounds and acetoacetanilide compounds which are free from solubilizing groups may be used. Beta-naphthol, 1-phenyl-3-methyl-5-pyrazolone, acetoacetanilide and meta-toylene-diamine are mentioned as illustrations of satisfactory developing agents but others can be used. Beta naphthol produces developed dyeings of generally excellent properties and exceptional washing fastness and it is the preferred coupling component.

The preferred dyes are those in which Aryl₁ is the radical of aniline and Aryl₂ is the radical of aniline, meta-toluidine or cresidine.

Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

What is claimed is:

1. A compound represented by the formula

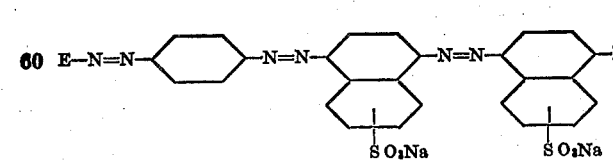

in which R is at least one of the group consisting of hydrogen, alkyl, alkoxy and hydroxy; E is the radical of an azo dye coupling component which is devoid of solubilizing groups; and the naphthalene-containing components are residues of Cleve's acid.

2. A compound represented by the formula

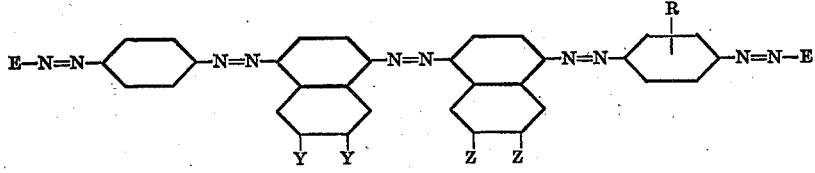

in which one Y and one Z are sulfonic acid groups and the other Y and other Z are hydrogen, R is at least one of the group consisting of hydrogen, alkyl, alkoxy and hydroxy, and E is the radical of an azo dye coupling component which is devoid of solubilizing groups.

3. The compound represented by the formula

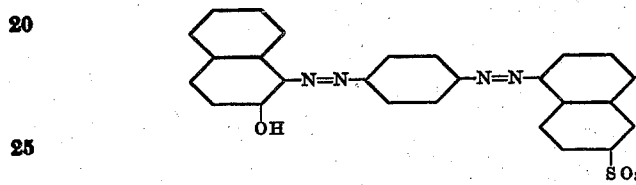

4. The compound represented by the formula

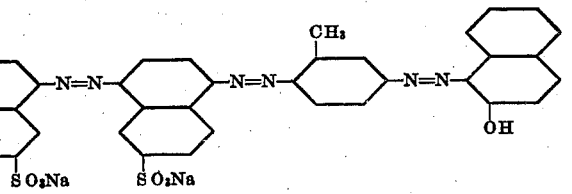

5. The compound represented by the formula

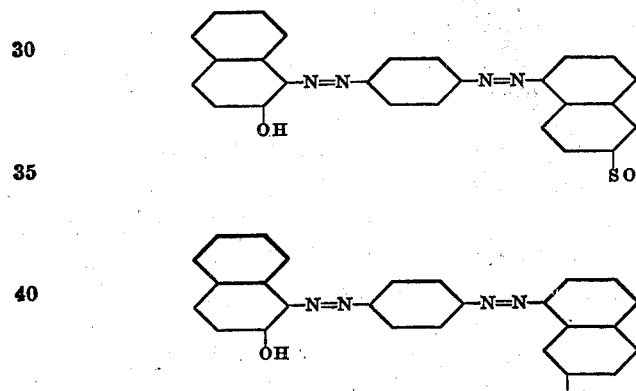

6. Textile cellulosic fabric dyed with a compound of claim 1.

7. Textile cellulosic fabric dyed with a compound of claim 2.

8. Textile cellulosic fabric dyed with the compound of claim 3.

9. Textile cellulosic fabric dyed with the compound of claim 4.

10. Textile cellulosic fabric dyed with the compound of claim 5.

11. The process which comprises dyeing a textile material with a compound represented by the formula

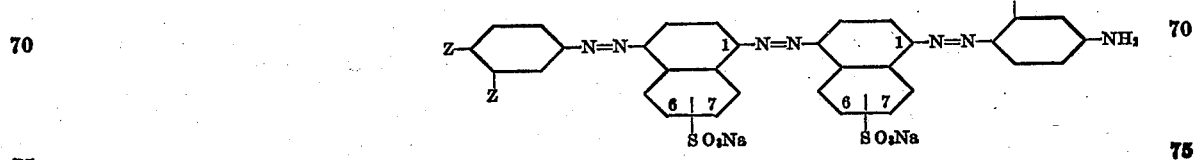

in which the sulfonic acid groups are in one of the positions 6 and 7 in the naphthalene nuclei; one Z is hydrogen and the other Z is amino; applying a diazotizing mixture to the dyed material until the compound is tetrazotized; and then applying to the material an azo dye coupling component which is free from solubilizing groups until a product of coupling is formed.

12. The process which comprises dyeing a textile material with a compound represented by the formula

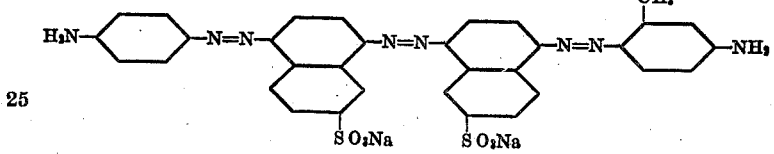

applying a diazotizing mixture to the dyed material until the compound is tetrazotized; and then applying to the material an azo dye coupling component which is free from solubilizing groups until a product of coupling is formed.

13. The process which comprises dyeing a textile material with a compound represented by the formula

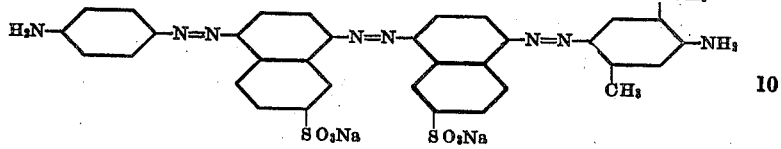

applying a diazotizing mixture to the dyed material until the compound is tetrazotized; and then applying to the material an azo dye coupling component which is free from solubilizing groups until a product of coupling is formed.

MARGARET R. MURPHY,
*Administratrix of the Estate of Arthur R. Murphy, Deceased.*

SWANIE S. ROSSANDER.